(12) United States Patent
Hosseinian et al.

(10) Patent No.: US 7,769,075 B2
(45) Date of Patent: Aug. 3, 2010

(54) METHOD AND APPARATUS FOR CHANNEL ESTIMATION USING TIME-FREQUENCY LOCALIZED PILOTS AND DE-NOISING TECHNIQUES

(75) Inventors: Seyed M. Hosseinian, Commack, NY (US); Aykut Bultan, Bayside, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 762 days.

(21) Appl. No.: 11/687,345

(22) Filed: Mar. 16, 2007

(65) Prior Publication Data

US 2007/0217530 A1 Sep. 20, 2007

Related U.S. Application Data

(60) Provisional application No. 60/783,221, filed on Mar. 17, 2006, provisional application No. 60/783,641, filed on Mar. 17, 2006, provisional application No. 60/783,642, filed on Mar. 17, 2006, provisional application No. 60/783,607, filed on Mar. 17, 2006.

(51) Int. Cl.
*H04B 1/00* (2006.01)

(52) U.S. Cl. .......................... 375/140; 375/316; 375/346

(58) Field of Classification Search ................. 375/140, 375/316, 346
See application file for complete search history.

(56) References Cited

U.S. PATENT DOCUMENTS 7,221,645 B2 * 5/2007 Wang et al. ................. 370/203

| 7,411,894 | B2 * | 8/2008 | Ro et al. ..................... 370/203 |
| 7,433,433 | B2 * | 10/2008 | Wilhelmsson et al. ....... 375/350 |
| 7,436,757 | B1 * | 10/2008 | Wilson et al. ............... 370/203 |
| 2002/0122381 | A1 * | 9/2002 | Wu et al. .................... 370/208 |

(Continued)

FOREIGN PATENT DOCUMENTS

WO    WO 2007109064 A1 *   9/2007

OTHER PUBLICATIONS

Xia, "Channel estimation in low SNR environments using chirp signals and joint time-frequency filters", this paper appears in: IEEE First Workshop on Multimedia Signal Processing, 1997, Publication Date: Jun. 23-25, 1997 on pp. 383-388 Meeting Date: Jun. 23, 1997-Jun. 25, 1997.*

(Continued)

*Primary Examiner*—Juan A Torres
(74) *Attorney, Agent, or Firm*—Volpe and Koenig, PC

(57) ABSTRACT

A method and apparatus for performing channel estimation using time-frequency localized pilots and de-noising techniques are disclosed. A transmitter sends pilot symbols which are localized in a joint time-frequency domain to a receiver for channel estimation. The receiver receives the pilot symbols and performs a time-frequency analysis, such as a discrete Gabor transform (DGT), to transform the received pilot symbols to a joint time-frequency domain. The receiver applies a de-noising technique, such as masking, to separate the pilot symbols from the embedded noise in the joint time-frequency domain. The receiver performs a time-frequency synthesis, such as an inverse discrete Gabor transform (IDGT), to generate a noise-removed pilot symbols in a time domain. The noise left after de-noising is only that part that overlaps with the pilot symbols in the joint time-frequency domain. The receiver then performs channel estimation with the noise-removed pilot symbols.

6 Claims, 9 Drawing Sheets

U.S. PATENT DOCUMENTS

| | | | |
|---|---|---|---|
| 2003/0072254 A1* | 4/2003 | Ma et al. .................... | 370/208 |
| 2003/0076777 A1* | 4/2003 | Stuber et al. ................ | 370/206 |
| 2004/0165650 A1* | 8/2004 | Miyazaki et al. ............ | 375/141 |
| 2006/0035643 A1* | 2/2006 | Vook et al. .................. | 455/450 |
| 2006/0050799 A1* | 3/2006 | Hou et al. ................... | 375/260 |
| 2006/0139495 A1* | 6/2006 | Huang et al. ................ | 348/614 |
| 2006/0255989 A1* | 11/2006 | Kim et al. ................... | 341/120 |
| 2007/0165588 A1* | 7/2007 | McCoy ....................... | 370/344 |
| 2007/0183386 A1* | 8/2007 | Muharemovic et al. ..... | 370/344 |
| 2007/0195906 A1* | 8/2007 | Kim et al. ................... | 375/267 |

OTHER PUBLICATIONS

Sony, "Signal De-Noising using the Wavelet Transform and Regularization", IEEE 1997 International Conference on Acoustics, Speech and Signal Processing, ICASSP 1997, vol. 3, p. 1861 (https://nats-www.informatik.uni-hamburg.de/intern/proceedings/1997/ICASSP/pdf/author/ic971861.pdf.*

Lee, "Noise reduction for channel estimation based on pilot-block averaging in DVB-T receivers", IEEE Transactions on Consumer Electronics, vol. 52, Issue 1, Feb. 2006 pp. 51-58.*

International Search report for PCT/2007/006463 dated Mar. 15, 2007.*

3GPP, *3rd Generation Partnership Project; Technical Specification Group Radio Access Network; Physical Layer Aspects For Evolved Universal Terrestrial Radio Access (UTRA) (Release 7)*, 3GPP TR 25.814 V7.1.0 (Sep. 2006).

3GPP, *3rd Generation Partnership Project; Technical Specification Group Radio Access Network; Physical Layer Aspects For Evolved UTRA (Release 7)*, 3GPP TR 25.814 V1.1.1 (Feb. 2006).

Branislav M. Popović, *Generalized Chirp-Like Polyphase Sequences With Optimum Correlation Properties*, IEEE Transactions On Information Theory, No. 4, pp. 1406-1409, (Jul. 1992).

Bultan et al., *Channel Estimation in Noisy Conditions Using Time-Frequency Domain Filtering*, Signals, Systems, And Computers, 1999. Conference Record Of The Thirty-Third Asilomar Conference, vol. 2, pp. 1642-1646, (Oct. 1999).

Bultan et al., *System Identification With Denoising*, in Proceedings IEEE International Conference on Acoust., Speech, Signal Processing, (Istanbul, Turkey Jun. 2000).

David C. Chu, *Polyphase Codes With Good Periodic Correlation Properties*, IEEE Transactions On Information Theory, pp. 531-532, (Jul. 1972).

Frank et al., *Phase Shift Pulse Codes With Good Periodic Correlation Properties*, IRE Transactions On Information Theory, pp. 381-382, (Oct. 1962).

Xiang-Gen Xia, *System Identification Using Chirp Signals And Time-Variant Filters In The Joint Time-Frequency Domain*, IEEE Transactions on Signal Processing, vol. 45, No. 8, pp. 2072-2084, (Aug. 1997).

Zhuang et al., *GCL-Based Preamble Design for 1024,512 And 128 FFT Sizes In The OFDMA PHY Layer*, IEEE C80216e-04/241r1, (Aug. 2004).

* cited by examiner

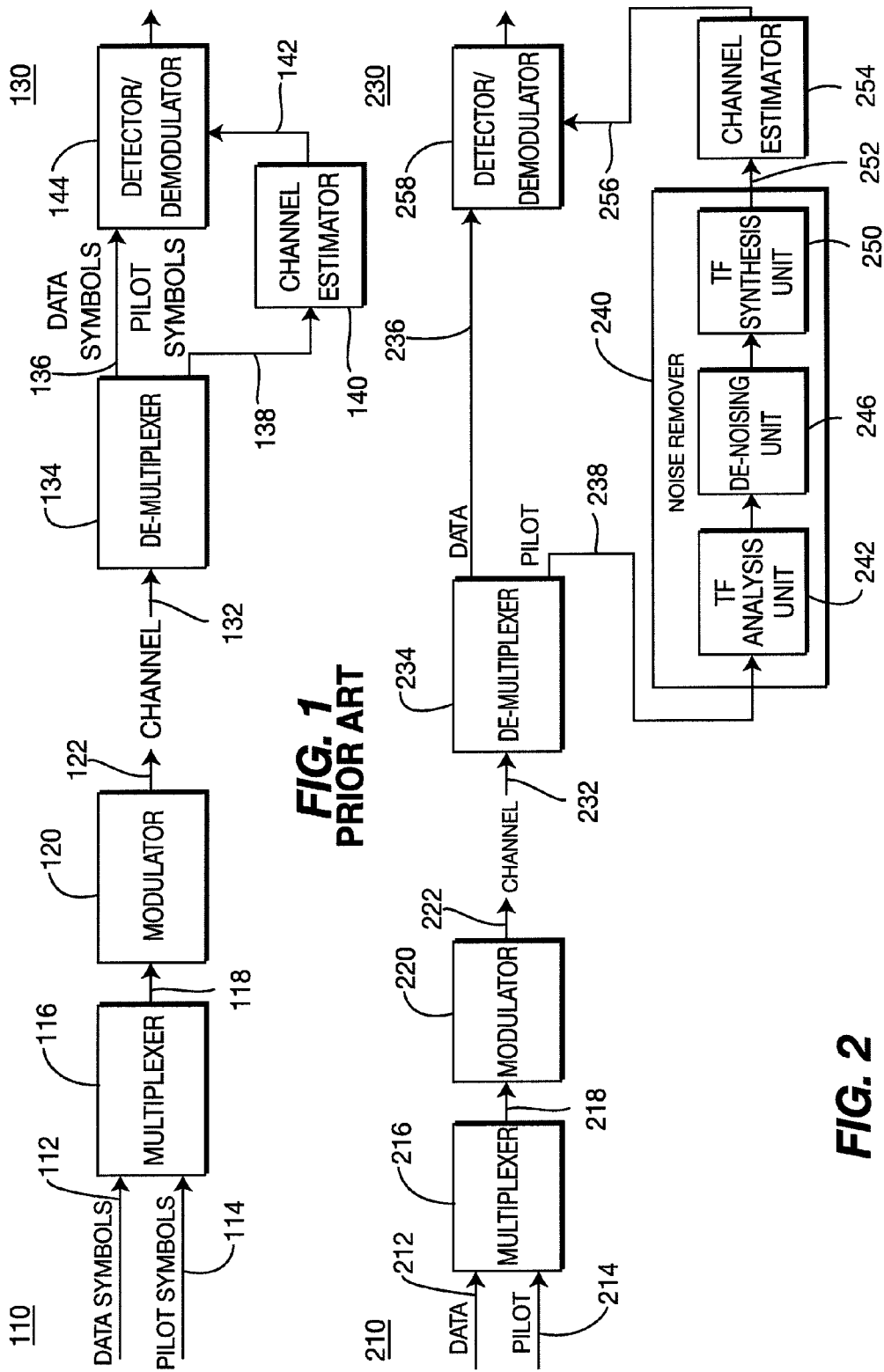

METHOD AND APPARATUS FOR CHANNEL ESTIMATION USING TIME-FREQUENCY LOCALIZED PILOTS AND DE-NOISING TECHNIQUES

CROSS REFERENCE TO RELATED APPLICATIONS

This application claims the benefit of U.S. provisional application Nos. 60/783,221 filed Mar. 17, 2006, 60/783,641 filed Mar. 17, 2006, 60/783,642 filed Mar. 17, 2006, and 60/783,607 filed Mar. 17, 2006, which are incorporated by reference as if fully set forth.

FIELD OF THE INVENTION

The present invention is related to wireless communication systems. More particularly, the present invention is related to a method and apparatus for channel estimation using time-frequency localized pilots and de-noising techniques.

BACKGROUND

Channel estimation is an important aspect of wireless communication systems, since the performance of such systems is directly related to the accuracy of the channel estimation. The channel estimation should be as robust as possible under any wireless channel conditions. However, conventional channel estimation is usually poor under a low signal-to-noise ratio (SNR) channel condition.

FIG. 1 is a block diagram of a transmitter 110 and a receiver 130 implementing a conventional channel estimation method. At the transmitter 110, data symbols 112 and pilot symbols 114 are multiplexed by a multiplexer 116. The multiplexing of the pilot and data symbols may be performed in a time domain, a frequency domain, or a code domain. The multiplexed data and pilot symbols 118 are modulated by a modulator 120 and the modulated data and pilot symbols 122 are transmitted via a channel. At the receiver 130, a demultiplexer 134 separates the data symbols 136 and pilot symbols 138 from the received signal 132. A channel estimator 140 performs channel estimation using the received pilot symbols 138. Interpolation in a time domain, in a frequency domain, or both between pilot symbols may be performed. A detector/demodulator 144 detects and demodulates the data symbols based on the channel estimate 142.

Conventional channel estimation schemes are vulnerable to high noise power levels, which results in poor receiver performance and high detection errors. Since the conventional channel estimation is performed by using non-localized pilots, such as pseudo-noise (PN) sequences, it is not possible to apply time-frequency domain de-noising techniques.

Therefore, it would be desirable to provide a method and apparatus for channel estimation using time-frequency localized pilots and de-noising techniques.

SUMMARY

The present invention is related to a method and apparatus for channel estimation using time-frequency localized pilots and de-noising techniques. A transmitter sends pilot symbols that are localized in a joint time-frequency domain to a receiver for channel estimation. The receiver receives the pilot symbols and performs a time-frequency analysis, such as a discrete Gabor transform (DGT), to transform the received pilot symbols to a joint time-frequency domain. The receiver applies a de-noising technique, such as masking, to separate the pilot symbols from the embedded noise in the joint time-frequency domain. The receiver performs a time-frequency synthesis, such as an inverse discrete Gabor transform (IDGT), to generate noise-removed pilot symbols in a time domain. The noise left after de-noising is only that part that overlaps with the pilot symbols in the joint time-frequency domain. The receiver then performs channel estimation with the noise-removed pilot symbols.

BRIEF DESCRIPTION OF THE DRAWINGS

The foregoing summary, as well as the following detailed description of the preferred embodiments of the present invention will be better understood when read with reference to the appended drawings, wherein:

FIG. 1 is a block diagram of a conventional transmitter and receiver employing conventional channel estimation scheme;

FIG. 2 is a block diagram of a transmitter and a receiver configured in accordance with a first embodiment of the present invention;

DETAILED DESCRIPTION OF THE PREFERRED EMBODIMENTS

Figure 3:
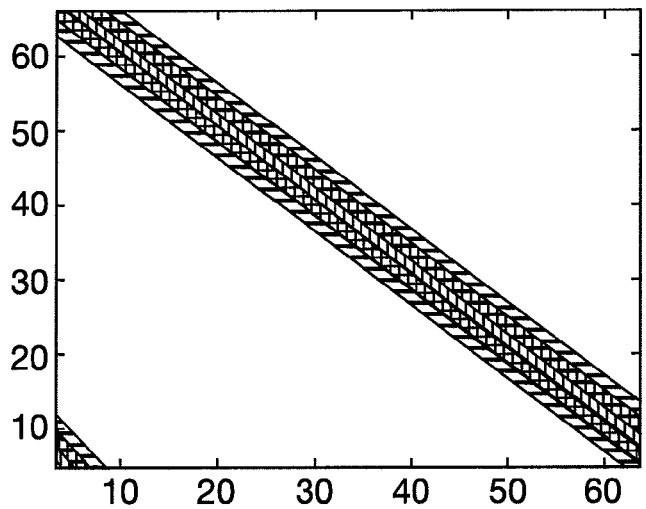
FIG. 3 shows a time-frequency distribution of a chirp sequence.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention may be implemented in any type of wireless communication system including, but not limited to, wideband code division multiple access (WCDMA), time division duplex (TDD), frequency division duplex (FDD), orthogonal frequency division multiplexing (OFDM), multiple-input multiple-output (MIMO), or any other type of wireless communication system.

The present invention provides a channel estimation method and apparatus that works efficiently even in a low SNR channel condition. In accordance with the present invention, the transmitter transmits a pilot sequence that is localized in a joint time-frequency domain and the receiver performs time-frequency analysis and de-noising in the joint time-frequency domain to reduce noise before channel estimation. By performing de-noising before channel estimation, a significant amount of noise can be removed from the received pilot sequence and therefore, an SNR before channel estimation is significantly increased. This is not achievable by the conventional method since the conventional method uses PN sequences or other sequences that are not localized in the joint time-frequency domain and therefore, noise reduction techniques cannot be applied before channel estimation. The simulation results show that the channel estimation method of the present invention outperforms the conventional channel estimation methods specifically in a low SNR channel condition.

FIG. 2 is a block diagram of a transmitter 210 and a receiver 230 configured in accordance with a first embodiment of the present invention. The transmitter 210 includes a multiplexer 216 and a modulator 220. The multiplexer 216 multiplexes data symbols 212 and pilot symbols 214. The pilot symbols 214 may be transmitted continuously. The multiplexed data symbols and pilot symbols 218 are modulated by the modulator 220, and the modulated data symbols and pilot symbols 222 are transmitted via a channel.

The receiver 230 includes a demultiplexer 234, a noise remover 240, a channel estimator 254 and a detector/demodulator 258. The demultiplexer 234 separates received data symbols 236 and received pilot symbols 238 from the received data 232. The received pilot symbols 238 are sent to the noise remover 240. The noise remover 240 performs joint time-frequency domain processing to remove noise from the received pilot symbols 238, which will be explained in detail hereinafter. The noise-removed pilot symbols 252 are then sent to the channel estimator 254 that performs channel estimation based on the noise-removed pilot symbols 252. The received data symbols 236 are sent to the detector/demodulator 258. The detector/demodulator 258 detects and demodulates the transmitted data symbols based on the channel estimate 256 generated by the channel estimator 254. The channel estimation may be performed iteratively.

The noise remover 240 includes a time-frequency (TF) analysis unit 242, a de-noising unit 246 and a time-frequency synthesis unit 250. The time-frequency analysis unit 242 performs joint time-frequency analysis to transform the received pilot symbols 238 to a joint time-frequency domain. The time-frequency analysis unit 242 may perform any conventional joint time-frequency analysis method, (e.g., DGT).

The de-noising unit 246 then applies a de-noising technique, (such as masking), to separate the pilot symbols from the embedded noise in the joint time-frequency domain. The masking operation is performed in the time-frequency domain. The output of the time-frequency analysis unit 242 is a matrix whose entries represent how the energy of the input signal is concentrated in the time-frequency domain. In its simplest form, the masking operation is basically multiplying the matrix output of the time-frequency analysis unit 242 with a matrix whose entries are unity around the region where the input signal energy is concentrated and localized and zero otherwise. The matrix multiplication is performed entrywise, (i.e., Hadamard product.). Since the transmitted pilot symbols are localized in a time-frequency plane, the pilot symbols may be separated from the embedded noise in the joint time-frequency domain, which will be explained in detail hereinafter.

The time-frequency synthesis unit 250 performs a time-frequency synthesis, (e.g., IDGT), to generate a noise-removed pilot symbols in a time domain. The output of the time-frequency synthesis unit contains minimal noise. The noise left after de-noising is only that part that overlaps with the pilot symbols in the joint time-frequency domain.

The conventional pilot symbol-based channel estimation may be formulated as follows:

$$y(n) = \sum_m p(m)h(n-m) + w(n); \qquad \text{Equation (1)}$$

where p[n] is the transmitted pilot signal, h[n] is the impulse response of the channel, w[n] is the additive white noise, and y[n] is the received signal. The object of the channel estimation is to find h[n], given the received signal y[n].

A conventional method uses the cross-spectral density method in stationary cases as follows:

$$H(w) = \frac{S_{py}(w)}{S_{pp}(w)}; \qquad \text{Equation (2)}$$

where H(w) is the Fourier transform of h[n], $S_{py}(w)$ is the cross-spectrum of p[n] and y[n], and $S_{pp}(w)$ is the auto-spectrum of p[n]. The accuracy of the channel estimation is directly proportional to the SNR. The effective SNR may be improved if the noise variance is decreased. However, since the conventional pilot sequences are PN sequences that are spread both in time and frequency domain like additive noise, it is not possible to separate pilot symbols and noise in time or frequency domains for PN sequences.

Figure 4:
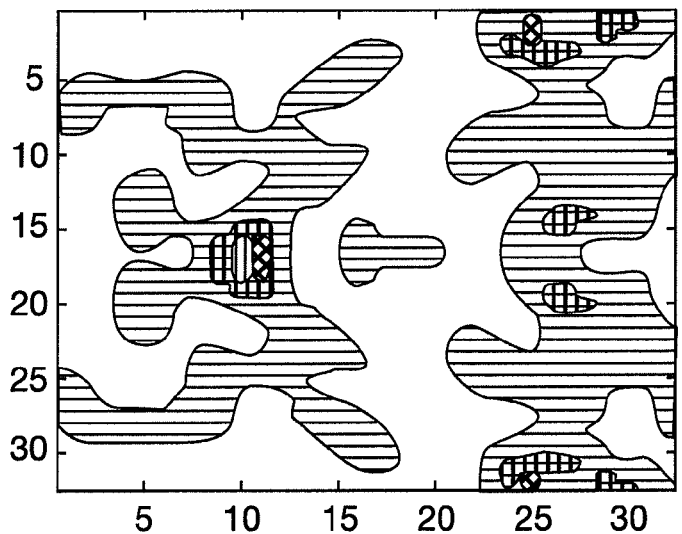
FIG. 4 shows a time-frequency distribution of a PN sequence.

In accordance with the present invention, a chirp signal may be used as a pilot sequence. Since the chirp signal is localized in the joint time-frequency domain, a de-noising technique may be applied to separate the pilot symbols from the embedded noise. FIGS. 3 and 4 show time frequency distributions (TFDs) of a chirp sequence and a conventional PN sequence, respectively. The TFD is a tool that approximates the energy distribution of a signal in the joint time-frequency plane. In FIG. 3, the TFD of the chirp signal is localized along the diagonal line in the joint time-frequency plane. In contrast, the TFD of the conventional PN sequence is spread all over the time-frequency plane as shown in FIG. 4.

Referring again to FIG. 2, the received pilot symbols 238 are localized in the joint time-frequency plane. That means most of the signal energy of the pilot symbols is localized in a small area in the time-frequency plane and the rest is mainly additive noise. The de-noising unit 246 extracts only the part of the signals that belongs to the area where the pilot symbols are located in the joint time-frequency domain. As a result, a noise variance is lowered and an effective SNR is increased.

With de-noising in accordance with the present invention, Equation (1) may be written as follows:

$$\hat{y}(n) = \sum_m p(m)h(n-m) + \hat{w}(n); \quad \text{Equation (3)}$$

where $\hat{w}(n)$ is the remaining noise after de-noising.

One of the well known time-frequency analysis and synthesis methods are DGT and IDGT. DGT represents any signal in terms of time shifted and frequency modulated, (i.e., frequency shifted), Gaussian functions. Gaussian functions have a minimum spread in the joint time-frequency plane due to uncertainty principle. DGT may be used for de-noising by using time-frequency domain masks. It should be noted that DGT and IDGT are examples of the time-frequency analysis and synthesis methods and any other time-frequency analysis and synthesis methods may be used.

DGT may be defined by synthesis and analysis equations as follows:

$$s(n) = \sum_{l=0}^{L-1} \sum_{k=0}^{K-1} C_{l,k} g_{l,k}(n); \quad \text{Equation (4)}$$

$$C_{l,k} = \sum_{n=0}^{N-1} s(n)\gamma_{l,k}^*(n); \quad \text{Equation (5)}$$

$$g_{l,k}(n) = g(n-l\Delta L)W_N^{k\Delta K n}; \quad \text{Equation (6)}$$

$$\gamma_{l,k}(n) = \gamma(n-l\Delta L)W_N^{k\Delta K n}; \text{ and} \quad \text{Equation (7)}$$

$$W_N = e^{j\frac{2\pi}{N}}; \quad \text{Equation (8)}$$

where $g(n)$ is a Gaussian function and the synthesis window, $\gamma(n)$, is obtained by solving the completeness condition below:

$$\sum_{n=0}^{N-1} g(n+lK)W_N^{-kLn}\gamma^*(n) = \delta(l)\delta(k), \quad \text{Equation (9)}$$
$$0 \leq l \leq \Delta K - 1,$$
$$0 \leq k \leq \Delta L - 1;$$

where $\Delta L$ and $\Delta K$ are the time and the frequency sampling interval lengths, and L and K are the numbers of sampling points in the time and the frequency domains, respectively. The following relation should be satisfied for completeness condition to be true:

$$L\Delta L = K\Delta K = N, \ LK \geq N.$$

DGT and IDGT may be represented in matrix forms as follows:

$$C = (C_{0,0}, C_{0,1}, \ldots, C_{L-1,K-1})^T; \text{ and} \quad \text{Equation (10)}$$

$$s = (s(0), s(1), \ldots, s(N-1))^T. \quad \text{Equation (11)}$$

The DGT may be represented by the LK×N matrix H whose (lK+k)th row and nth column element is given by:

$$\gamma_{l,k}^*(n) = \gamma^*(n-l\Delta L)W_N^{-k\Delta K n}; \quad \text{Equation (12)}$$

where $0 \leq l \leq L-1$, $0 \leq k \leq K-1$, and $0 \leq n \leq N-1$.

IDGT may be represented by the N×LK matrix G whose nth row and (lK+k)th column element is given by:

$$g_{l,k}(n) = g(n-l\Delta L)W_N^{k\Delta K n}; \quad \text{Equation (13)}$$

where $0 \leq l \leq L-1$, $0 \leq k \leq K-1$, $0 \leq n \leq N-1$.

The analysis and synthesis equations may be written in matrix forms as follows:

$$C = Hs; \text{ and} \quad \text{Equation (14)}$$

$$s = GC. \quad \text{Equation (15)}$$

The condition implies that:

$$GH = I; \quad \text{Equation (16)}$$

where I is the identity matrix.

The de-noising may be performed by multiplying the Gabor coefficients by a mask in the time-frequency plane that is localized around the pilot symbol energy. The signal is then constructed for the masked (or filtered) Gabor coefficients. Because Gabor is a non-orthogonal redundant transformation, this operation may be repeated more than once. If the LK×LK mask matrix is represented as D, the time-frequency domain masking may be represented as follows:

$$s_0 = s; \quad \text{Equation (17)}$$

$$C_{i+1} = DHs_i; \text{ and} \quad \text{Equation (18)}$$

$$s_{i+1} = HC_{i+1}, \ l = 0, 1, 2, \ldots \quad \text{Equation (19)}$$

Figure 5:
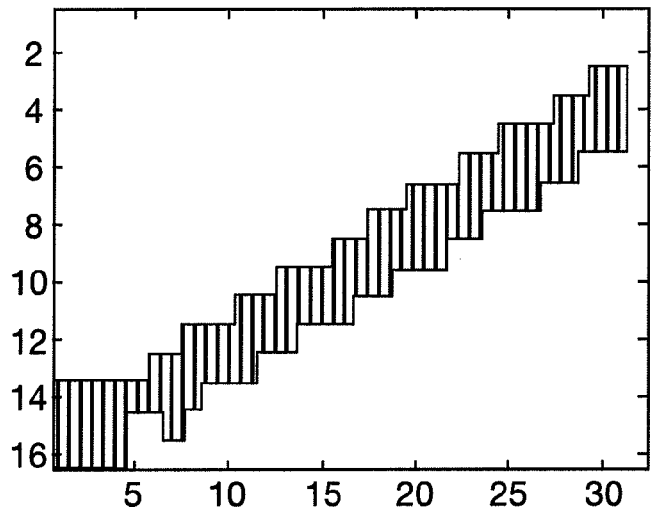
FIG. 5 shows a sample mask covering the trace of a localized sequence.

A sample mask that covers the trace of the localized pilot symbols is illustrated in FIG. 5.

The pilot sequence must be well localized in the joint time-frequency domain for the channel estimator to yield the best performance. A chirp-like sequence that belongs to constant amplitude zero autocorrelation (CAZAC) family and has a very low peak-to-average power ratio (PAPR) may be used as a pilot sequence. Examples of the chirp-like sequences that may be used as a pilot sequence includes a Zadoff-Chu sequence, a Frank sequence, a generalized chirp-like sequence type I, a generalized chirp-like sequence type II, or the like. FIGS. 6-9 show joint time-frequency plots for these chirp-like sequences. For all plots, the horizontal and vertical axis represent time and frequency dimensions, respectively.

Figure 6:
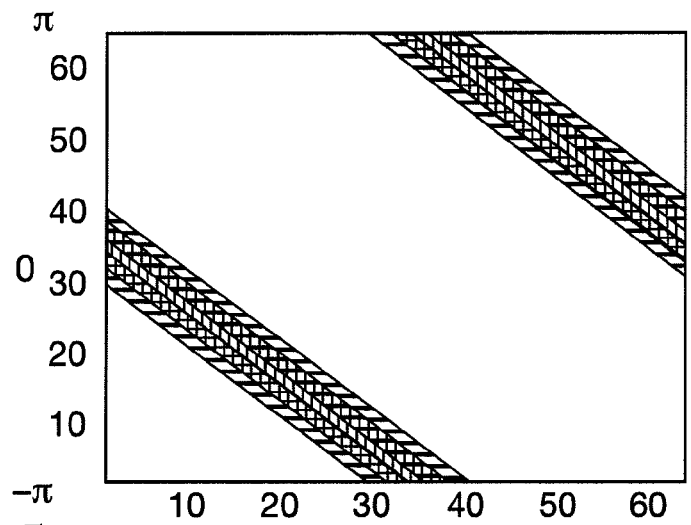
FIG. 6 shows a joint time-frequency plot for a Zadoff-Chu sequence with N=128, r=1, q=0.

Zadoff-Chu sequence:

$$a_k = \begin{cases} \exp\left(\frac{-j2\pi r}{N}\left(\frac{k^2}{2}+qk\right)\right), & k=0,1,\ldots,N-1 \ \ N \text{ even} \\ \exp\left(\frac{-j2\pi r}{N}\left(\frac{k(k+1)}{2}+qk\right)\right), & k=0,1,\ldots,N-1 \ \ N \text{ odd}; \end{cases} \quad \text{Equation (20)}$$

where N is the length of the Zadoff-Chu sequence, q is any integer and r is chosen either 1 or −1 to have sequences localized in joint time-frequency domain. FIG. 6 shows a joint time-frequency plot for the Zadoff-Chu sequence with N=128, r=1, q=0.

Figure 7:
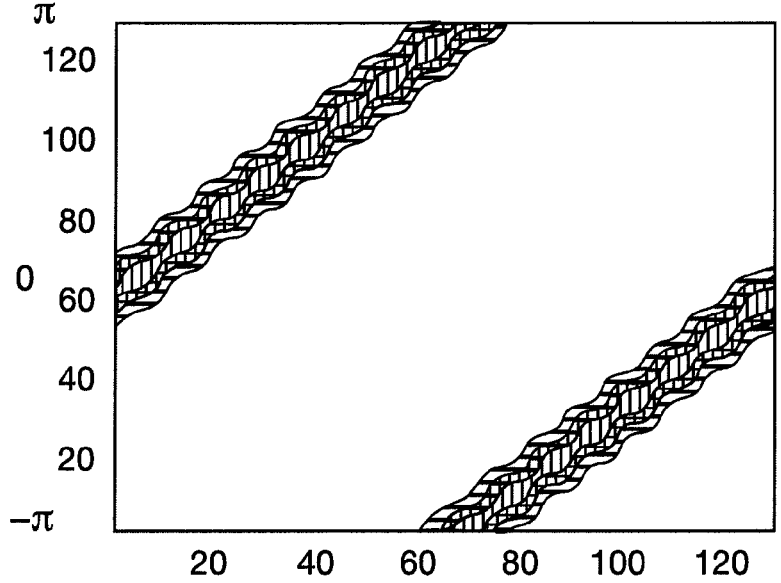
FIG. 7 shows a joint time-frequency plot for a Frank sequence with N=256, r=1.

Frank sequence:

$$a_k = \exp(j2\pi rpq/\sqrt{N}), k=p+q\sqrt{N}, p,q=0, 1, \ldots, \sqrt{N}-1; \quad \text{Equation (21)}$$

where N is the length of the Frank sequence that has to be a complete square and r is chosen 1 or −1 to have sequences localized in joint time-frequency domain. FIG. 7 shows a joint time-frequency plot for the Frank sequence with N=256, r=1.

Figure 8:
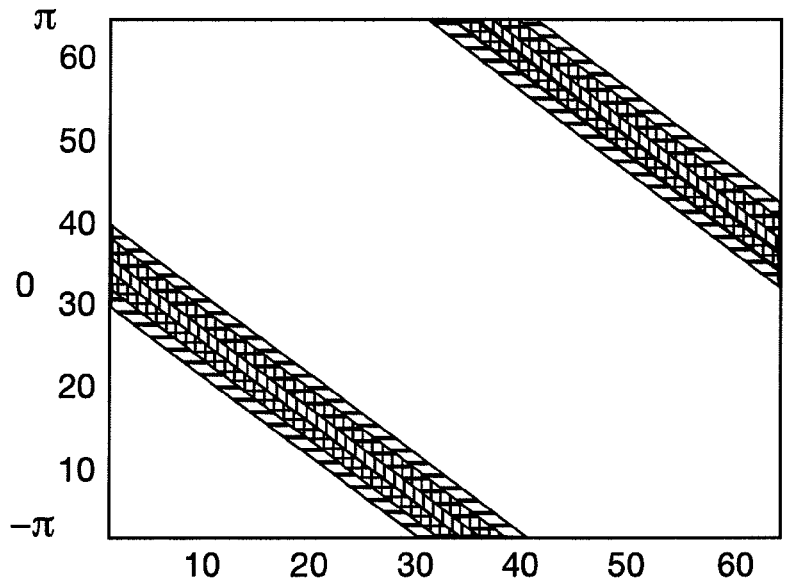
FIG. 8 shows a joint time-frequency plot for a generalized chirp-like (GCL) sequence type I with N=128, r=1, Ng=131.

GCL sequence type I:

$$a_k = \exp(-j\pi rk(k+1)/N_g), r=1, \ldots, N_g; \quad \text{Equation (22)}$$

where N is the length of the GCL sequence, Ng is the smallest prime number greater than N, and r is chosen either 1 or −1 to have sequences localized in joint time-frequency domain. FIG. 8 shows a joint time-frequency plot for the GCL sequence type I with N=128, r=1, Ng=131.

Figure 9:
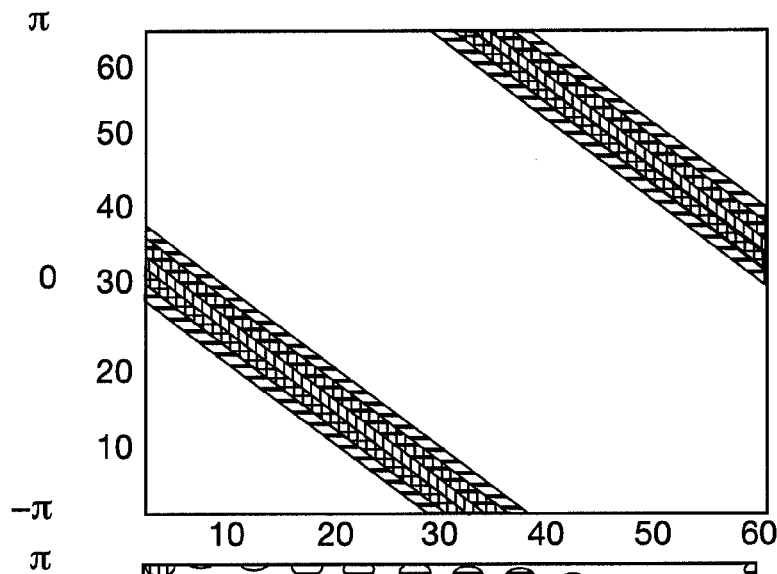
FIG. 9 shows a joint time-frequency plot for a GCL sequence type II with N=128, r=1, q=0.

Generalized chirp-like (GCL) sequence type II:

$$s_k = a_k b_{k \bmod m}, k=0,1, \ldots, N-1; \quad \text{Equation (23)}$$

where N is the length of the GCL sequence, $a_k$ is the Zadoff-Chu sequence, m is a positive integer such that $N=um^2$, where u is an integer, and $b_k$ is any sequence of m complex numbers having an absolute value of 1. The original Zadoff-Chu is set to be localized (by choosing r=−1 or 1). Consequently, the GCL sequence type II is also localized. FIG. 9 shows a joint time-frequency plot for the GCL sequence type II with N=128, r=1, q=0.

Figure 10:
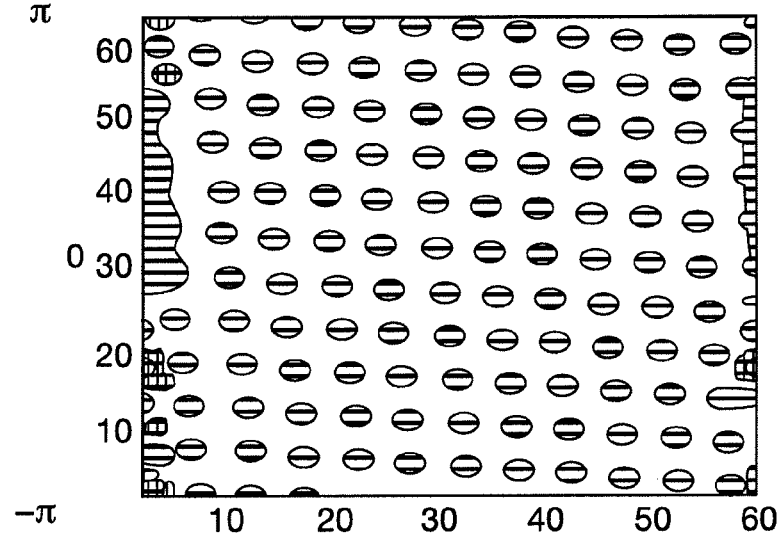
FIG. 10 shows a joint time-frequency plot for a GCL sequence type I with N=128, r=11, Ng=131.
Figure 11:
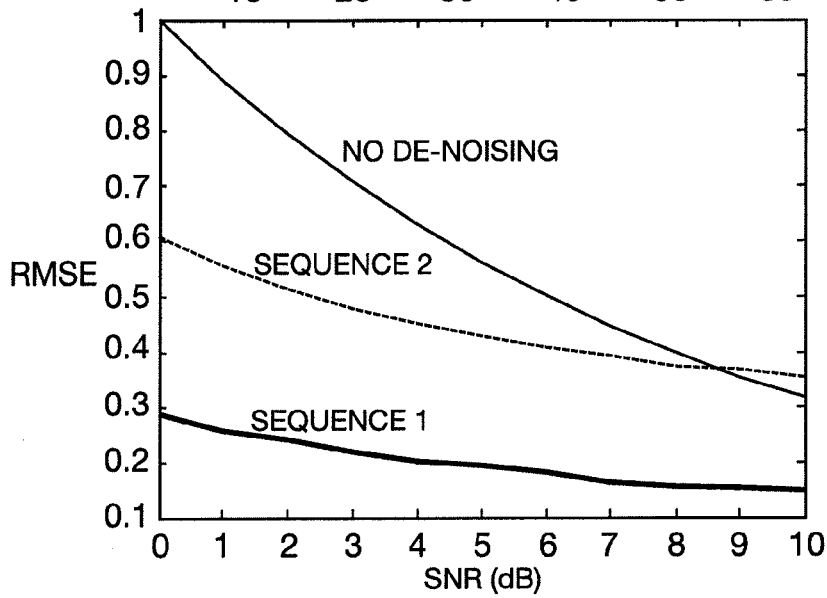
FIG. 11 shows root means square error (RMSE) vs. SNR for a GCL sequence type I with r=1, a GCL sequence type I with r=11 and no de-noising case.

Simulation results are explained hereinafter with reference to FIGS. 8, 10 and 11. Two sequences are used as a pilot sequence in the simulation. The first sequence is a GCL type I with r=1 and the second sequence is a GCL type I with r=11. The joint time-frequency plot of the first sequence is shown in FIG. 8 and the joint time-frequency plot of the second sequence is shown in FIG. 10. As shown in FIG. 8, the first sequence is very well localized in the joint time-frequency domain. However, the second sequence is not well localized in the joint time-frequency domain and exhibits a noise-like joint time-frequency distribution.

The two sequences are passed through an additive white Gaussian noise (AWGN) channel. The received sequences are then transformed to a joint time-frequency domain by DGT. By a simple threshold masking technique, the sequences are de-noised and brought back to time domain by IDGT. FIG. 11 shows RMS error vs. SNR for a GCL sequence type I with r=1, a GCL sequence type I with r=11 and no de-noising case. As shown in FIG. 11, the RMS error using the first sequence, which is localized in the time-frequency domain, is much lower than that of the second sequence, which is not localized in the time-frequency domain. The RMS error using any of the first and second sequence is lower than the case that no de-noising is performed.

A second embodiment for performing a channel estimation scheme in a multiple-input multiple-output (MIMO) system is explained hereafter. This embodiment utilizes time-frequency analysis followed by de-noising in a receiver to reduce noise and cancel interference from pilot signals from other antennas before channel estimation. By employing de-noising techniques a significant amount of noise as well as pilot interference can be removed from the received pilot signal before channel estimation. In other words, a signal to interference plus noise ratio (SINR) before channel estimation is significantly increased.

Figure 12:
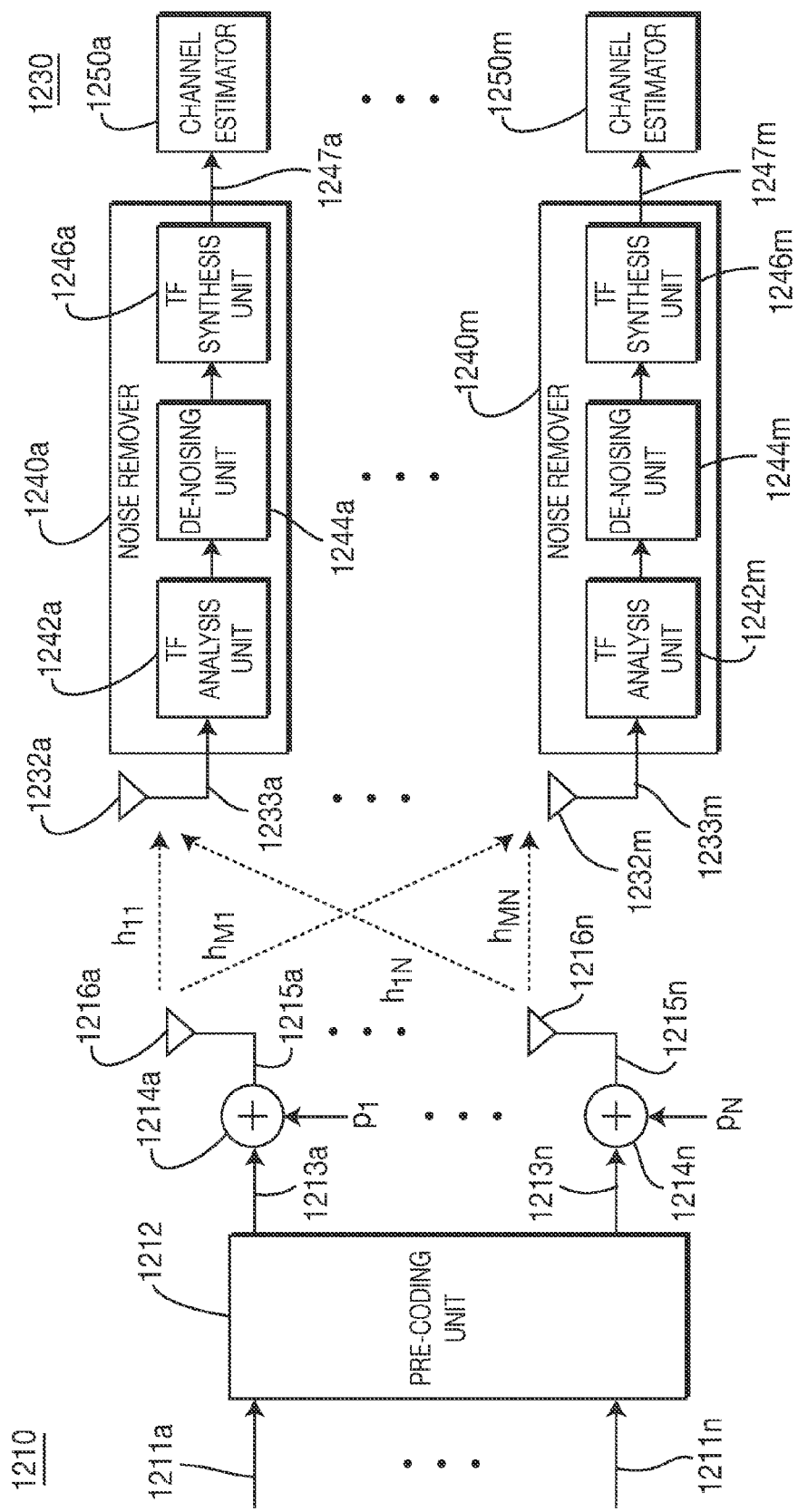
FIG. 12 is a block diagram of a transmitter and a receiver configured in accordance with a second embodiment of the present invention.

FIG. 12 is a block diagram of a transmitter 1210 and a receiver 1230 configured in accordance with the second embodiment of the present invention. The transmitter 1210 includes a pre-coding unit 1212, a plurality of adders 1214a-1214n, and a plurality of transmit antennas 1216a-1216n. Input data 1211a-1211n is pre-coded by the pre-coding unit 1212. Pilot sequences, $p_1 \ldots p_M$, are added to the pre-coded data 1213a-1213n. Preferably, the pilot sequences are not pre-code so that the receiver 1230 may estimate the raw MIMO channel (H) by receiving the per antenna pilots. The pilot and data symbols 1215a-1215n are transmitted via the transmit antennas 1216a-1216n.

The receiver 1230 includes a plurality of receive antennas 1232a-1232m, a plurality of noise removers 1240a-1240m and a plurality of channel estimators 1250a-1250m. Data and pilot symbols received by each of the receive antennas 1232a-1232m are separated from each other. The separated pilot symbols 1233a-1233m are sent to the corresponding noise remover 1240a-1240m.

The noise remover 1240a-1240m performs joint time-frequency domain processing to remove noise from the received pilot symbols 1233a-1233m. Each noise remover 1240a-1240m includes a time-frequency analysis unit 1242a-1242m, a de-noising unit 1244a-1244m, and a time-frequency synthesis unit 1246a-1246m.

The time-frequency analysis unit 1242a-1242m performs joint time-frequency analysis to transform the pilot symbols 1233a-1233m to a joint time-frequency domain. The time-frequency analysis unit 1242a-1242m may perform any conventional joint time-frequency analysis method, (e.g., DGT).

The de-noising unit 1244a-1244m then applies a de-noising technique, (such as multiple masking), to separate the pilot symbols from the embedded noise and interfering pilots from other antennas in the joint time-frequency domain. Since the transmitted pilot symbols are localized in a time-frequency plane, the pilot symbols may be separated from the embedded noise in the joint time-frequency domain.

The time-frequency synthesis unit 1246a-1246m performs a time-frequency synthesis, (e.g., IDGT), to generate a noise-removed pilot symbols 1247a-1247m in a time domain. The output of the time-frequency synthesis unit contains minimal noise since the pilots are chosen not to overlap in a time-frequency domain. The noise left after de-noising is only that part that overlaps with the pilot symbols in the joint time-frequency domain.

The noise-removed pilot symbols 1247a-1247m are then sent to the channel estimators 1250a-1250m that performs channel estimation based on the noise-removed pilot symbols 1247a-1247m.

Preferably, a subset of chirp like sequences that belong to CAZAC family and have very low PAPR, (e.g., a Zadoff-Chu sequence, a Frank sequence, a GCL sequence type I, a GCL sequence type II, or any other sequence that is localized in a joint time-frequency domain), is used as a pilot sequence as stated above.

In order to remove the noise effectively, the pilot sequences must be very well localized in a time-frequency domain and the pilot sequences used for different antennas must not overlap each other in a time-frequency domain after going through multipath channel. The first condition guarantees successful de-noising by masking operation, while the second condition makes it possible to cancel the interference from other pilots simply by masking operation.

To satisfy the first condition, r in Equations (20)-(23) is preferably chosen either 1 or −1 in all sequences, although it is not necessarily limited to those values. To satisfy the second condition, the pilot sequences for different antennas may be chosen from the same sequence family with different values for q. For example, the following rule may be used for selection of q. For an antenna m, (m=1, . . . , M), q=(m−1)N/M, where N is the length of the pilot sequence. Assume a MIMO system with 4 transmit antennas, where each transmit antenna uses a Zadoff-Chu sequence with a length of 256. According to the above rule, q is chosen as 0, 64, 128, and 192 for antennas 1, 2, 3, and 4, respectively. During transmission of pilot sequences the received signal $r_1(t)$ at a receive antenna 1 is written as follows:

$$r_1(t) = p_1(t) * h_{11}(t) + p_2(t) * h_{12}(t) + p_3(t) * h_{13}(t) + p_4(t) * h_{14}(t) + n(t);$$
Equation (24)

where $p_i(t)$ (i=1, . . . , 4) is a pilot sequence assigned to a transmit antenna i, $h_{1i}(t)$ (i=1, . . . , 4) is a channel impulse response between transmit antenna i and receive antenna 1, and n(t) is additive noise.

Figure 13:
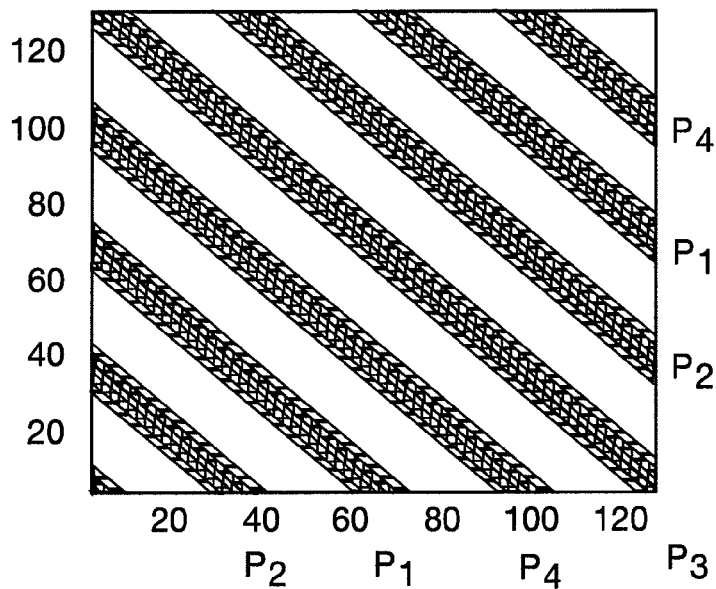
FIG. 13 shows the time-frequency domain representation of four pilots before going through channel.
Figure 14:
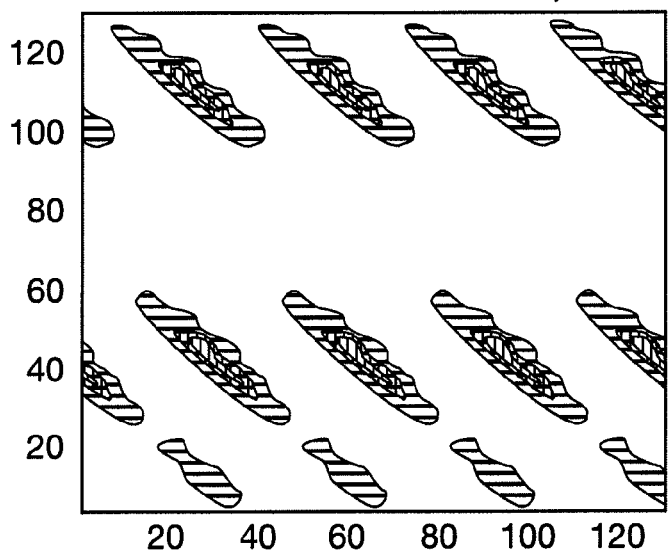
FIG. 14 shows the time-frequency domain representation of the received signal.
Figure 15:
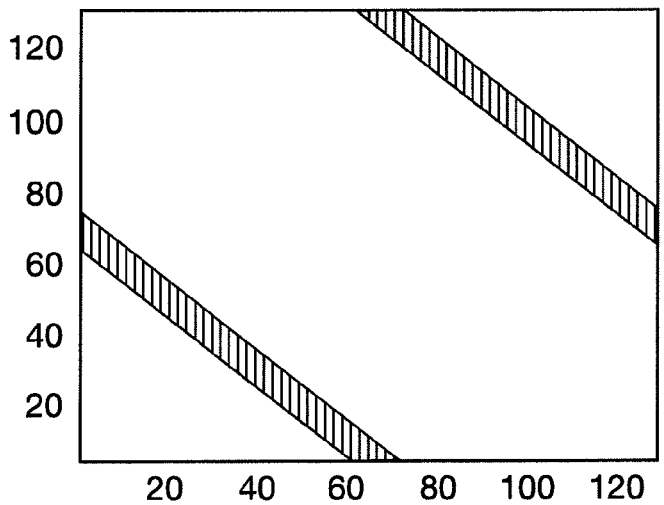
FIG. 15 shows an exemplary mask to retrieve a pilot sequence $p_1(t)$.

FIG. 13 shows the time-frequency domain representation of all four pilots before going through a transmission channel, and FIG. 14 shows the time-frequency domain representation of the received signal. As shown in FIG. 14, the traces of the pilots are still distinguishable. By appropriate masking in a time-frequency domain, it is possible to remove both noise and interference at the same time. FIG. 15 shows an exemplary mask to retrieve the pilot sequence $p_1(t)$.

A third embodiment for performing a channel estimation scheme in a single carrier frequency division multiple access (SC-FDMA) MIMO system is explained hereafter. This embodiment utilizes time-frequency analysis followed by de-noising in a receiver to reduce noise and cancel interference from pilot signals from different antennas and different WTRUs before channel estimation. By employing de-noising techniques a significant amount of noise as well as pilot interference can be removed from the received pilot signal before channel estimation. In other words, both an SNR and a signal-to-interference ratio (SIR) before channel estimation are significantly increased. The interference may originate from the serving cell, (i.e., pilots from other transmit antennas or pilots from other WTRUs).

Figure 16:
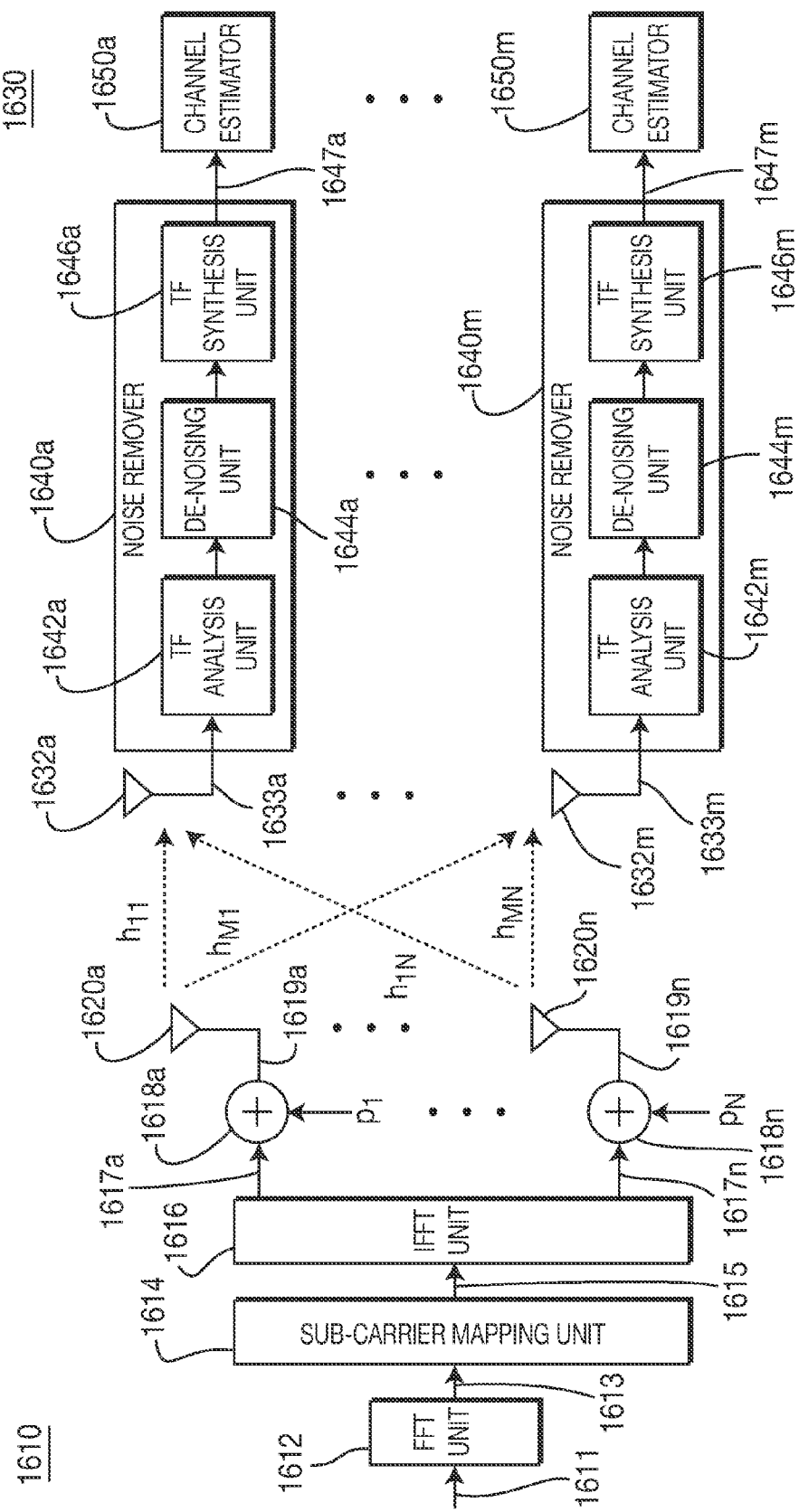
FIG. 16 is a block diagram of a transmitter and a receiver configured in accordance with a third embodiment of the present invention.

FIG. 16 is a block diagram of a transmitter 1610 and a receiver 1630 configured in accordance with the third embodiment of the present invention. The transmitter 1610 includes a fast Fourier transform (FFT) unit 1612, a subcarrier mapping unit 1614, an inverse FFT (IFFT) unit 1616, a plurality of adders 1618a-1618n, and a plurality of transmit antennas 1620a-1620n. Input data 1611 in time domain is processed by the FFT unit 1612 to be converted to a frequency domain data 1613. The frequency domain data 1613 is mapped to subcarriers by the subcarrier mapping unit 1614. The subcarrier mapped data 1615 is then converted to a time domain data 1617a-1617n by the IFFT unit 1616.

Pilot sequences, $p_1 \ldots p_M$, are added to the time domain data 1617a-1617n. Preferably, the pilot sequences are not pre-coded so that the receiver 1630 may estimate the raw MIMO channel (H) by receiving the per antenna pilots. The pilot and data symbols 1619a-1619n are transmitted via the transmit antennas 1620a-1620n.

The receiver 1630 includes a plurality of receive antennas 1632a-1632m, a plurality of noise removers 1640a-1640m and a plurality of channel estimators 1650a-1650m. Data and pilot symbols received by each of the receive antennas 1632a-1632m are separated from each other. The separated pilot symbols 1633a-1633m are sent to the corresponding noise remover 1640a-164m.

The noise remover 1640a-1640m performs a joint time-frequency domain processing to remove noise from the received pilot symbols 1633a-1633m. Each noise remover 1640a-1640m includes a time-frequency analysis unit 1642a-1642m, a de-noising unit 1644a-1644m, and a time-frequency synthesis unit 1646a-1646m.

The time-frequency analysis unit 1642a-1642m performs joint time-frequency analysis to transform the pilot symbols 1633a-1633m to a joint time-frequency domain. The time-frequency analysis unit 1642a-1642m may perform any conventional joint time-frequency analysis method, (e.g., DGT).

The de-noising unit 1644a-1644m then applies a de-noising technique, (such as multiple masking), to separate the pilot symbols from the embedded noise and interfering pilots from other antennas in the joint time-frequency domain. Since the transmitted pilot symbols are localized in a time-frequency plane, the pilot symbols may be separated from the embedded noise in the joint time-frequency domain.

The time-frequency synthesis unit 1646a-1646m performs a time-frequency synthesis, (e.g., IDGT), to generate a noise-removed pilot symbols 1647a-1647m in a time domain. The output of the time-frequency synthesis unit contains minimal noise since the pilots are chosen not to overlap in a time-frequency domain. The noise left after de-noising is only that part that overlaps with the pilot symbols in the joint time-frequency domain.

The noise-removed pilot symbols 1647a-1647m are then sent to the channel estimators 1650a-1650m that performs channel estimation based on the noise-removed pilot symbols 1647a-1647m.

Preferably, a subset of chirp like sequences that belong to CAZAC family and have very low PAPR, (e.g., a Zadoff-Chu sequence, a Frank sequence, a GCL sequence type I, a GCL sequence type II, or any other sequence that is localized in a joint time-frequency domain), is used as a pilot sequence as stated above.

In order to remove the noise effectively, the pilot sequences must be very well localized in a time-frequency domain and the pilot sequences used for different antennas and different WTRUs must not overlap each other in a time-frequency domain after going through the multipath channel. The first condition guarantees successful de-noising by a masking operation, while the second condition makes it possible to cancel the interference from other pilots simply by a masking operation.

To satisfy the first condition, r in Equations (20)-(23) is preferably chosen either 1 or −1 in all sequences, although it is not necessarily limited to those values. To satisfy the second condition, the pilot sequences for different antennas may be chosen from the same sequence family with different values for q. For example, the following rule may be used for selection of q. For an antenna m, (m=1, . . . , M), q=(m−1)N/M, where N is the length of the pilot sequence. Assume a MIMO system with 2 transmit antennas and 2 WTRUs, where M=4 and each transmit antenna uses a Zadoff-Chu sequence with a length of 256. According to the above rule, q is chosen as 0 and 64 for antennas 1 and 2 of WTRU 1 and 128 and 192 for antennas 1 and 2 of WTRU 2, respectively. During transmission of pilot sequences the received signal $r_1(t)$ at a receive antenna 1 is written as follows:

$$r_1(t) = p_1^{(1)}(t) * h_{11}^{(1)}(t) + p_2^{(1)}(t) * h_{12}^{(1)}(t) + p_1^{(2)}(t) * h_{11}^{(2)}(t) + p_2^{(2)}(t) * h_{12}^{(2)}(t) + n(t);$$
Equation (25)

where $p_i^{(u)}(t)$ (i=1,2 and u=1,2) is the pilot sequence assigned to transmit antenna i of user u and $h_{1i}^{(u)}(t)$ (i=1,2 and u=1,2) is channel impulse response between the transmit antenna i of user u and receive antenna 1. The additive noise is represented by n(t).

A fourth embodiment for performing a channel estimation scheme in an orthogonal frequency division multiplexing (OFDM) MIMO system is explained hereafter. This embodiment utilizes time-frequency analysis followed by de-noising in a receiver to reduce noise and interference from pilot and/or data signals from different antennas before channel estimation. By employing de-noising techniques, a significant amount of noise as well as pilot interference can be removed from the received pilot signal before channel estimation. In other words, a signal-to-noise and interference ratio (SNIR) before channel estimation is significantly increased. The interference may originate from transmit antennas of the same cell/sector or from transmit antennas of different cells/sectors belonging to the same Node-B.

Figure 17:
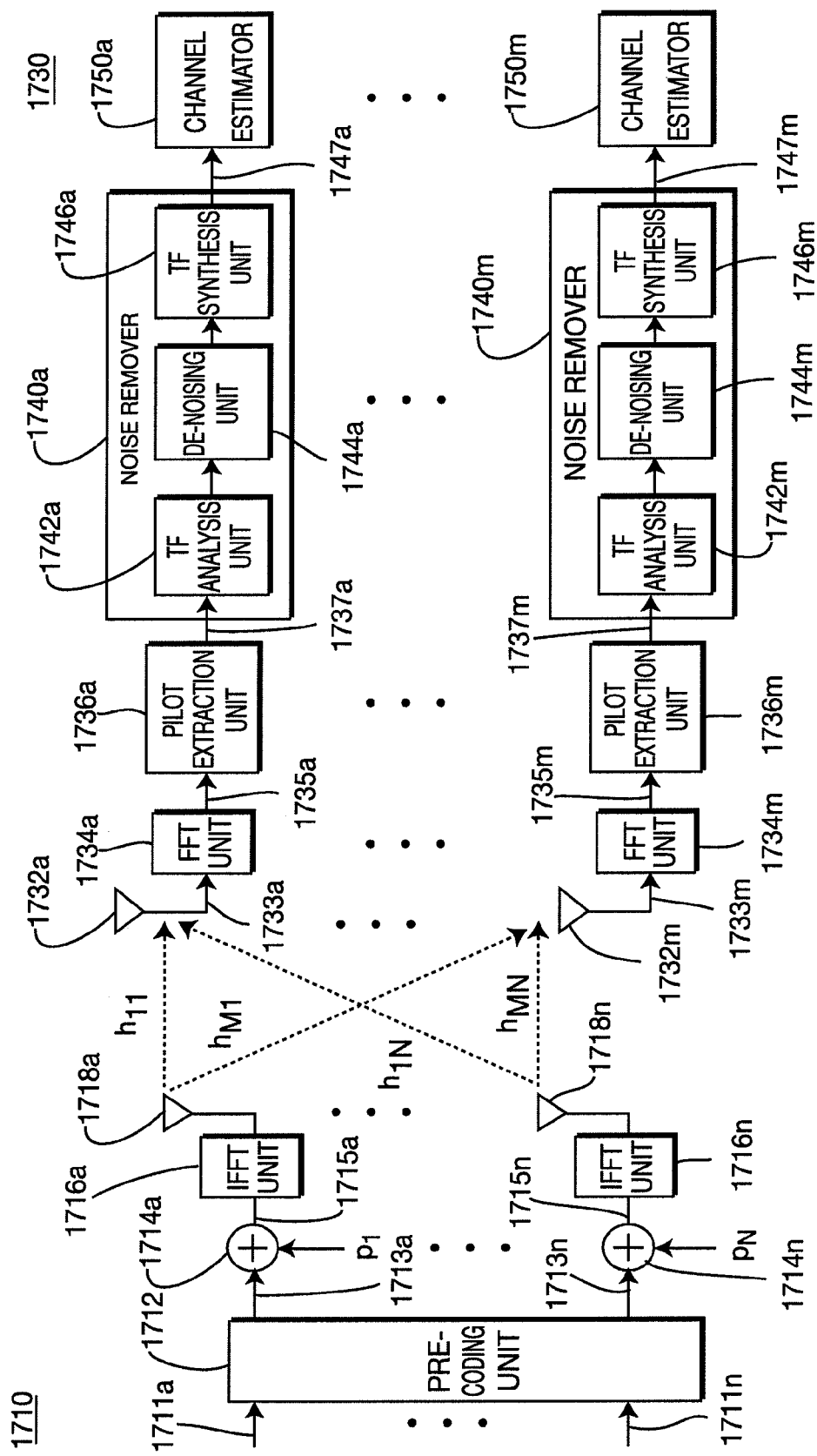
FIG. 17 is a block diagram of a transmitter and a receiver configured in accordance with a fourth embodiment of the present invention.

FIG. 17 is a block diagram of a transmitter 1710 and a receiver 1730 configured in accordance with the fourth embodiment of the present invention. The transmitter 1710 includes a pre-coding unit 1712, a plurality of adders 1714a-1714n, a plurality of IFFT units 1716a-1716n, and a plurality of transmit antennas 1718a-1718n. Input data 1711a-1711n is pre-coded by the pre-coding unit 1712. Pilot sequences, $p_1 \ldots p_M$, are added to the pre-coded data 1713a-1713n. Preferably, the pilot sequences are not pre-coded so that the receiver 1730 may estimate the raw MIMO channel (H) by receiving the per antenna pilots. The pilot and data symbols 1715a-1715n are processed by the IFFT units 1716a-1716n and transmitted via the transmit antennas 1718a-1718n.

The receiver 1730 includes a plurality of receive antennas 1732a-1732m, a plurality of pilot extraction units 1736a-1736m, a plurality of noise removers 1740a-1740m and a plurality of channel estimators 1750a-1750m. Data and pilot symbols 1733a-1733m are processed by the FFT units 1734a-1734m. Pilot symbols 1737a-1737m are extracted from the output 1735a-1735m of the FFT units 1734a-1734m by the pilot extraction units 1736a-1736m. The separated pilot symbols 1737a-1737m are sent to the corresponding noise remover 1740a-1740m.

The noise remover 1740a-1740m performs a joint time-frequency domain processing to remove noise from the received pilot symbols 1737a-1737m. Each noise remover 1740a-174m includes a time-frequency analysis unit 1742a-174m, a de-noising unit 1744a-174m, and a time-frequency synthesis unit 1746a-174m.

The time-frequency analysis unit 1742a-174m performs joint time-frequency analysis to transform the pilot symbols 1737a-173m to a joint time-frequency domain. The time-frequency analysis unit 1742a-174m may perform any conventional joint time-frequency analysis method, (e.g., DGT).

The de-noising unit 1744a-174m then applies a de-noising technique, (such as multiple masking), to separate the pilot symbols from the embedded noise and interfering pilots from other antennas in the joint time-frequency domain. Since the transmitted pilot symbols are localized in a time-frequency plane, the pilot symbols may be separated from the embedded noise in the joint time-frequency domain.

The time-frequency synthesis unit 1746a-174m performs a time-frequency synthesis, (e.g., IDGT), to generate a noise-removed pilot symbols 1747a-174m in a time domain. The output of the time-frequency synthesis unit 1746a-174m contains minimal noise since the pilots are chosen not to overlap in a time-frequency domain. The noise left after de-noising is only that part that overlaps with the pilot symbols in the joint time-frequency domain.

The noise-removed pilot symbols 1747a-174m are then sent to the channel estimator 1750a-175m that performs channel estimation based on the noise-removed pilot symbols 1747a-174m.

Figure 18:
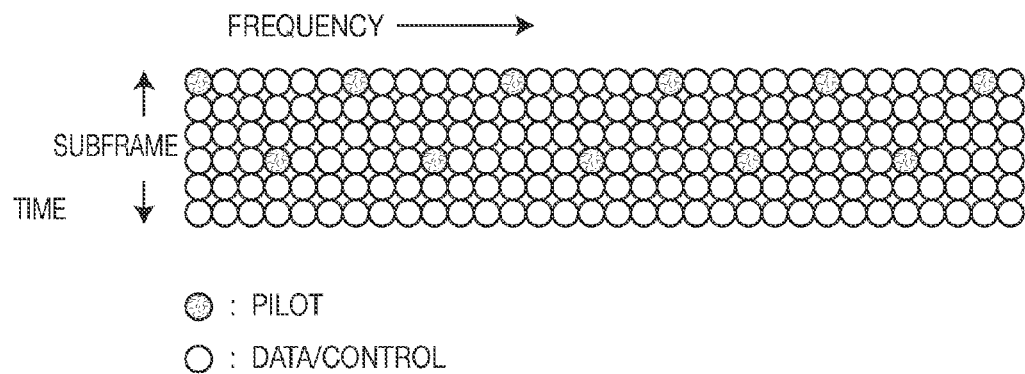
FIGS. 18 and 19 show exemplary downlink pilot structures in accordance with the present invention.

An exemplary downlink pilot structure is shown in FIG. 18. Pilot symbols are scattered among OFDM symbols. FIG. 18 shows an exemplary structure proposed for evolved universal terrestrial radio access (E-UTRA). In E-UTRA, the first and the third last OFDM symbols of the sub-frame contain pilot symbols, and the frequency separation between two adjacent pilots is 6 subcarriers. It should be noted that the present invention is not limited to scheme shown in FIG. 18, and for instance the frequency separation between adjacent pilots or the location of the pilot symbols may be different.

Figure 19:
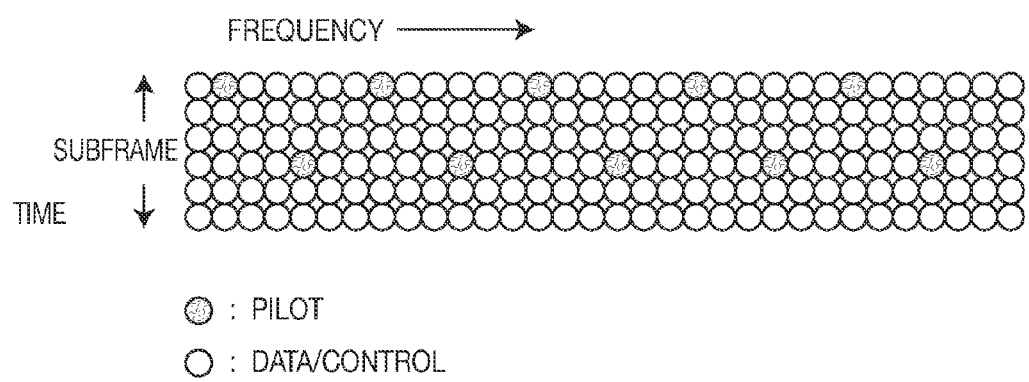

To achieve better channel estimation performance, pilot sequences sent by multiple antennas should be mutually orthogonal. The orthogonality among pilots of different transmit antennas of the same cell/sector is realized using frequency division multiplexing (FDM). In other words, different transmit antennas of the same cell/sector use different subcarriers for pilot symbols. For instance, antenna 2 of the same cell/sector may have a pilot structure as shown in FIG. 19. The orthogonality among pilot sequences of different cells/sectors belonging to the same Node B is realized using code division multiplexing (CDM).

Preferably, a subset of chirp like sequences that belong to CAZAC family and have very low PAPR, (e.g., a Zadoff-Chu sequence, a Frank sequence, a GCL sequence type I, a GCL sequence type II, or any other sequence that is localized in a joint time-frequency domain), is used as a pilot sequence as stated above.

In order to remove the noise effectively, the pilot sequences must be very well localized in a time-frequency domain and pilot sequences used for different cells/sectors belonging to the same Node-B must not overlap each other in the time-frequency domain after going through wireless channel. The first condition guarantees successful de-noising by masking operation, while the second condition makes it possible to cancel interference from other pilots simply by masking operation.

To satisfy the first condition, r in Equations (20)-(23) is preferably chosen either 1 or −1 in all sequences, although it is not necessarily limited to those values. To satisfy the second condition, the pilot sequences for different cells/sectors may be chosen from the same sequence family with different values for q. For example, the following rule may be used for selection of q. For an antenna m, (m=1, ..., M), q=(m−1)N/M, where N is the length of the pilot sequence. Assume an OFDM-MIMO system with 4 cells/sectors per Node-B, where each cell uses a Zadoff-Chu sequence with a length of 256. According to the above rule q is chosen as 0, 64, 128, and 192 for cells 1, 2, 3, and 4, respectively.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method, implemented by a wireless transmit/receive unit (WTRU) having a plurality of receive antennas, of performing channel estimation, the method comprising:
   each of the receive antennas receiving a plurality of pilot symbols;
   inputting the pilot symbols into respective noise removers in the WTRU that correspond to the receive antennas, wherein each noise remover:
      performs a joint time-frequency analysis to transform the pilot symbols to a joint time-frequency domain;
      applies a de-noising technique to separate the pilot symbols from embedded noise and interfering pilots from other ones of the receive antennas in the joint time-frequency domain; and
      performs a time-frequency synthesis to generate noise-removed pilot symbols; and
   performing channel estimation on noise-removed pilot symbols using respective channel estimators in the WTRU that correspond to the noise removers.

2. The method of claim 1 wherein the joint time-frequency analysis is performed by using a discrete Gabor transform (DGT), and the time-frequency synthesis is performed by using an inverse DGT.

3. The method of claim 1 wherein the de-noising technique is masking.

4. A wireless transmit/receive unit (WTRU) comprising:
   a plurality of receive antennas, each of the receive antennas configured to receive a plurality of pilot symbols;
   a plurality of noise removers, each noise remover configured to receive pilot symbols from a respective one of the receive antennas, wherein each noise remover comprises:
      a time-frequency analysis unit configured to perform a joint time-frequency analysis to transform the pilot symbols to a joint time-frequency domain;
      a de-noising unit configured to apply a de-noising technique to separate the pilot symbols from embedded noise and interfering pilots from other ones of the receive antennas in the joint time-frequency domain; and
      a time-frequency synthesis unit configured to perform a time-frequency synthesis to generate noise-removed pilot symbols; and
   a plurality of channel estimators, each channel estimator configured to perform channel estimation on noise-removed pilot symbols that correspond to a respective one of the noise removers.

5. The WTRU of claim 4 wherein the joint time-frequency analysis is performed by using a discrete Gabor transform (DGT), and the time-frequency synthesis is performed by using an inverse DGT.

6. The WTRU of claim 4 wherein the de-noising technique is masking.

* * * * *